(12) United States Patent
Stößel et al.

(10) Patent No.: US 7,958,800 B2
(45) Date of Patent: Jun. 14, 2011

(54) ACTUATION DEVICE

(75) Inventors: Veit Stößel, Nuremberg (DE); Matthias Wittkowski, Nuremberg (DE); Klaus Schwarm, Hilpolstein (DE)

(73) Assignee: Schukra-Geratebau AG, Berndorf (AT)

( * ) Notice: Subject to any disclaimer, the term of this patent is extended or adjusted under 35 U.S.C. 154(b) by 1452 days.

(21) Appl. No.: 11/168,022

(22) Filed: Jun. 28, 2005

(65) Prior Publication Data

US 2006/0011011 A1     Jan. 19, 2006

(30) Foreign Application Priority Data

Jul. 15, 2004 (DE) .......................... 10 2004 034 229

(51) Int. Cl.
*G05G 1/08* (2006.01)
(52) U.S. Cl. ....................................................... 74/505
(58) Field of Classification Search .................... 74/506, 74/505, 89.22, 89.37, 411.5, 425; 242/371, 242/381, 382, 385
See application file for complete search history.

(56) References Cited

U.S. PATENT DOCUMENTS

| | | |
|---|---|---|
| 823,971 A | 6/1906 | Remondy |
| 1,426,109 A | 8/1922 | Rudolph et al. |
| 3,631,951 A | 1/1972 | Quenneville |
| 3,726,370 A | 4/1973 | Hubbard, Jr. |
| 3,759,358 A | 9/1973 | Quenneville |
| 3,771,384 A * | 11/1973 | Hackman ........................ 74/505 |
| 3,796,292 A | 3/1974 | Harrison |
| 3,876,184 A | 4/1975 | Eudy |
| 3,933,225 A * | 1/1976 | Bretz, Jr. ........................ 188/33 |
| 4,014,422 A | 3/1977 | Morishita |
| 4,222,608 A | 9/1980 | Maeda |
| 4,316,631 A | 2/1982 | Lenz et al. |
| 4,354,709 A | 10/1982 | Schuster |
| 4,494,709 A | 1/1985 | Takada |
| 4,561,606 A | 12/1985 | Sakakibara et al. |
| 4,614,257 A | 9/1986 | Harada et al. |
| 4,778,138 A | 10/1988 | Yamada |
| 4,786,110 A | 11/1988 | Mahling et al. |
| 4,817,771 A | 4/1989 | Iten |
| 4,900,088 A | 2/1990 | Bechtle et al. |
| 5,010,780 A | 4/1991 | Hatfield |
| 5,050,930 A | 9/1991 | Schuster et al. |
| 5,080,434 A | 1/1992 | Locher |
| 5,186,412 A | 2/1993 | Park |
| 5,197,780 A | 3/1993 | Coughlin |

(Continued)

FOREIGN PATENT DOCUMENTS

DE     29 47 472     8/1980

(Continued)

*Primary Examiner* — Thomas R Hannon
*Assistant Examiner* — Phillip A Johnson
(74) *Attorney, Agent, or Firm* — Michael Best & Friedrich LLP

(57) ABSTRACT

An actuation device is provided for actuating a traction element (5), the actuation element comprising in particular a pivotally mounted force transmission element (1) for transferring an actuation force to the traction element (5). The force transmission element comprises first stop means (7), the actuation device further comprises second stop means (9), whereby a possible angle of rotation of the force transmission element (1) is limited. The first stop means (7) and/or the second stop means (9) comprise(s) a resilient element. A stop is thereby dampened and when the first stop means (7) butts against the second stop means (9) energy absorbed by the resilient element (7) can be used to assist a movement of the force transmission element (1) in an opposite direction.

19 Claims, 2 Drawing Sheets

U.S. PATENT DOCUMENTS

| | | | |
|---|---|---|---|
| 5,211,368 A | 5/1993 | Kitamura |
| 5,217,278 A | 6/1993 | Harrison et al. |
| 5,248,017 A | 9/1993 | Schwarzbich |
| 5,382,076 A | 1/1995 | Scheck et al. |
| 5,397,164 A | 3/1995 | Schuster et al. |
| 5,449,219 A | 9/1995 | Hay et al. |
| 5,522,488 A | 6/1996 | Schwarzbich |
| 5,567,010 A | 10/1996 | Sparks |
| 5,567,011 A | 10/1996 | Sessini |
| 5,593,210 A | 1/1997 | Schwarzbich |
| 5,609,394 A | 3/1997 | Ligon, Sr. et al. |
| 5,638,722 A | 6/1997 | Klingler |
| 5,651,584 A | 7/1997 | Chenot et al. |
| 5,681,005 A | 10/1997 | Ligon, Sr. et al. |
| 5,704,687 A | 1/1998 | Klingler |
| 5,769,491 A | 6/1998 | Schwarzbich |
| 5,769,493 A | 6/1998 | Pejathaya |
| 5,794,479 A | 8/1998 | Schwarzbich |
| 5,842,659 A | 12/1998 | Ligon, Sr. et al. |
| 5,865,285 A | 2/1999 | Minkenberg |
| 5,881,854 A | 3/1999 | Rougnon-Glasson |
| 6,038,817 A * | 3/2000 | Scheck et al. ............ 49/352 |
| 6,045,185 A | 4/2000 | Ligon, Sr. et al. |
| 6,050,641 A | 4/2000 | Benson |
| 6,053,064 A | 4/2000 | Gowing et al. |
| 6,158,300 A | 12/2000 | Klingler |
| 6,178,838 B1 | 1/2001 | Schwarzbich |
| 6,212,965 B1 | 4/2001 | Hochmuth |
| 6,227,617 B1 | 5/2001 | von Moller |
| 6,230,867 B1 | 5/2001 | Schwarzbich |
| 6,238,123 B1 | 5/2001 | Schwarzbich |
| 6,253,894 B1 | 7/2001 | Schumann et al. |
| 6,334,651 B1 | 1/2002 | Duan et al. |
| 6,345,549 B1 | 2/2002 | Lance |
| 6,422,651 B1 | 7/2002 | Muhlberger et al. |
| 6,481,557 B2 | 11/2002 | Denis |
| 6,488,134 B2 | 12/2002 | Becker et al. |
| 6,508,347 B1 | 1/2003 | Hochmuth |
| 6,520,307 B2 | 2/2003 | Becker et al. |
| 6,520,583 B1 | 2/2003 | Bonk |
| 6,536,840 B1 | 3/2003 | Schuster, Sr. et al. |
| 6,575,278 B1 | 6/2003 | Schumann et al. |
| 6,592,186 B1 | 7/2003 | Muhlberger et al. |
| 6,637,575 B2 | 10/2003 | Liu et al. |
| 6,675,945 B2 | 1/2004 | Kim |
| 6,681,910 B1 | 1/2004 | Schumann et al. |
| 6,691,851 B2 | 2/2004 | Liu et al. |
| 6,732,842 B2 | 5/2004 | Nemoto |
| 6,843,533 B1 | 1/2005 | Miyata et al. |
| 2001/0029797 A1 * | 10/2001 | Lange et al. ............ 74/89.37 |
| 2002/0135186 A1 * | 9/2002 | Chane-Waye ............ 290/38 R |
| 2003/0167872 A1 | 9/2003 | Frohnhaus et al. |

FOREIGN PATENT DOCUMENTS

| | | |
|---|---|---|
| DE | 29 53 749 | 9/1988 |
| DE | 40 31 656 A1 | 4/1992 |
| EP | 0 006 840 B1 | 2/1982 |
| EP | 0 322 525 A1 | 7/1989 |
| EP | 0 751 030 A1 | 1/1997 |
| EP | 0 751 032 B1 | 1/2001 |
| EP | 0 751 031 B1 | 9/2001 |
| EP | 0 885 164 B1 | 7/2002 |
| FR | 2 809 999 A1 | 12/2001 |
| GB | 141801 | 4/1920 |
| GB | 1 218 541 A | 1/1971 |
| GB | 2 057 255 A | 4/1981 |
| WO | WO 99/05000 | 2/1999 |
| WO | WO 01/74620 A1 | 10/2001 |
| WO | WO 02/11584 | 2/2002 |

* cited by examiner

ACTUATION DEVICE

The present invention relates to an actuation device for adjusting, namely tensioning and releasing, a traction element, for example a cable or a control cable. Such actuation devices are also described as actuators and are used for example in motor vehicle seats for adjusting backrests which can be bowed, so called lumbar supports. For example, by tensioning a corresponding traction element the backrest is increasingly bowed whilst the curvature is reduced when the traction element is released. The traction element is also for example wound onto a drum and unwound from the drum.

In such actuation devices it is necessary to limit an adjustment distance, namely the maximum distance to which the traction element can be shortened and tensioned. In the above example of a backrest which can be bowed, excessive load from a corresponding bowing mechanism which can lead to damage is thus prevented.

To this end mechanical stops can be provided. These have the disadvantage that a hard stop can lead to clamping of the actuation device which hinders or prevents further actuation of the actuation device.

A further possibility is an electronic control where the actuation device slowly approaches a corresponding end position of the adjustment distance. Such electronic controls are however costly to produce and therefore relatively expensive.

An object of the present invention therefore is to provide an actuation device in which an adjustment distance is limited, the actuation device being easy to produce and the danger of jamming when it reaches one end of the adjustment distance being reduced.

This object is achieved by an actuation device according to claim 1 and by an actuation device according to claim 17. The dependent claims describe advantageous or preferred embodiments of the present invention.

According to the invention an actuation device is provided to actuate a traction element, the actuation device comprising a movably mounted force transmission element to transfer an actuation force to the traction element. The force transmission element comprises a first stop means to limit a movement of the force transmission element in cooperation with a fixed second stop means. By limiting the movement an adjustment distance of the traction element is restricted. According to the invention the first stop means and/or the second stop means is designed to be resilient.

As a result of a resilient first stop means and/or a resilient second stop means being provided the stop is not hard but is dampened. The danger of jamming is thereby reduced.

Furthermore the resilient stop means offers the advantage that when it respectively butts against the other stop means it absorbs energy which it can again release in an opposite direction during a subsequent rotation of the force transmission element. The release of optionally occurring jamming or clamping is thereby facilitated.

The actuation device can further comprise a drum element coupled to the force transmission element to wind on and unwind the traction element which can in particular be coaxially arranged with the force transmission element and can be made in one piece therewith. The force transmission element can be a gear wheel whereby an actuation force produced for example by a drive motor can be transferred to the force transmission element.

The resilient stop means can in particular be designed as a spring. If the force transmission element is a gear wheel, this spring can be inserted into the gear wheel to form the first stop means, so that an axis of the spring, along which the spring can be tensioned and released, stands perpendicular to a radius of the gear wheel and is located in the plane of the gear wheel. It is further preferred that the spring is fitted into the gear wheel such that it projects over an upper face and over a lower face of the gear wheel.

The actuation device can further comprise a housing which comprises the second stop means. The second stop means preferably comprises two fixed stops, a first fixed stop being provided on an upper face of the force transmission element and a second fixed stop being provided on a lower face of the force transmission element. By these measures, when the first stop means butts against the first and the second fixed stop, a force is exerted acting on the force transmission element substantially in a plane defined by the force transmission element which further reduces the danger of the force transmission element jamming.

The force transmission element can be pivotally or linear movably mounted.

The invention will hereinafter be described in further detail with reference to a preferred embodiment and to the accompanying drawings, in which.

Figure 1:
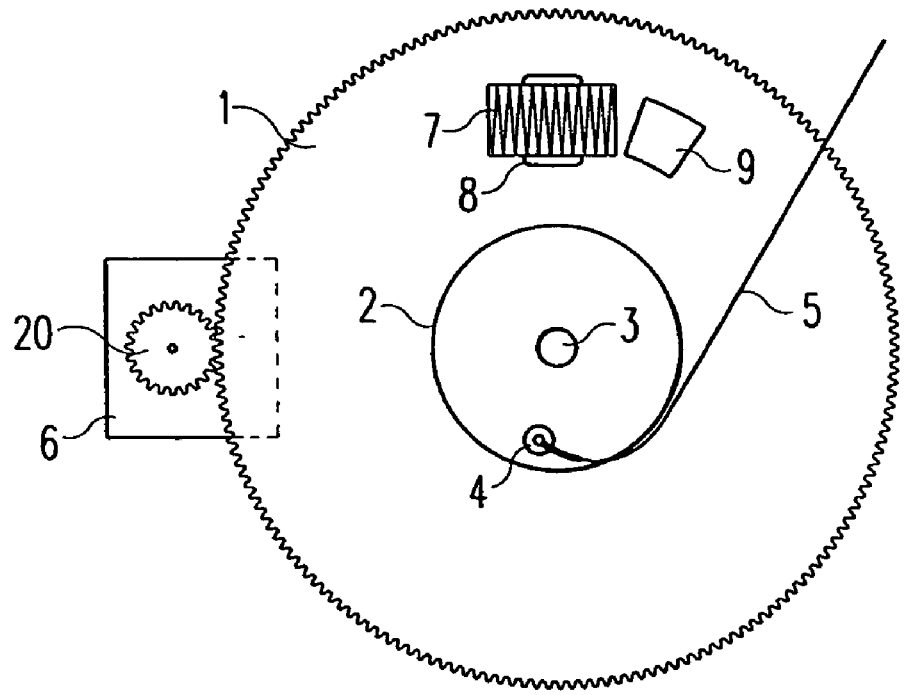
FIG. 1 is a plan view of an actuation device according to the invention.
Figure 2:
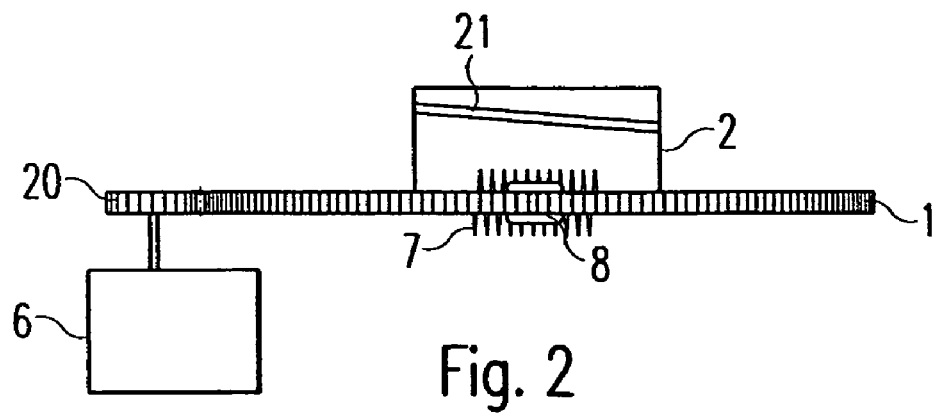
FIG. 2 is a side view of the actuation device in FIG. 1.

In FIG. 1 an actuation device according to an embodiment of the present invention is shown in plan view. FIG. 2 shows a corresponding side view.

The actuation device shown in FIGS. 1 and 2 comprises a drive motor 6, for example an electric motor, the driving force thereof being transferred via a gear wheel 20 to a gear wheel 1. The gear wheel 1 serves to transfer the driving force of the motor 6 to a traction element 5, for example a control cable or an actuating cable. Such an actuating cable can in particular also be a cable of a Bowden cable.

A drum 2 is coaxially arranged with the gear wheel 1 to wind on the traction element 5. The drum 2 can be produced in one piece with the gear wheel 1 or in another manner rigidly connected therewith. The gear wheel 1 and the drum 2 comprise a recess 3 along their rotational axis through which recess a rigid axle extends.

The drum 2 comprises a recess 4, as shown in FIG. 1, in which a thickened end of the traction element 5 can be secured. The traction element 5 can however also be fastened in another manner on the drum 2. As is visible in particular in FIG. 2 a guide channel 21 can furthermore be constructed in the drum 2. When the traction element 5 is wound onto the drum 2 the traction element 5 then extends into this guide channel 21 which allows controlled winding and in particular prevents the traction element 5 from slipping from the drum 2.

The gear wheel 1 further comprises a recess into which a spiral spring 7 is inserted. As is visible in FIG. 2, the spiral spring 7 is moreover arranged such that it protrudes both upwardly and downwardly from a plane of the gear wheel 1. If the recess is suitably dimensioned the spiral spring 7 can be simply clamped therein. For improved support, thickenings 8 can be provided in the gear wheel 1. Permanent fastening of the spiral spring however is conceivable, for example by means of bonding or by means of a web extending through the spiral spring 7 in the plane of the gear wheel 1. When the spiral spring 7 is fastened care must however be taken that despite the fastening it can be compressed and can release itself.

A fixed stop 9 is further provided which is positioned such that the spiral spring 7 butts against the fixed stop 9 when the gear wheel 1 is correspondingly positioned. As is described below with reference to FIGS. 3 and 4, this fixed stop 9 can form part of a separate housing of the actuation device. It is however also possible to provide the fixed stop 9 in another manner in a device into which the actuation device is inserted. Such a fixed stop 9 is preferably located both above the gear wheel 1 and below the gear wheel 1—seen in FIG. 2—, so that both the part of the spiral spring 7 protruding upwardly from the plane of the gear wheel 1 and the part of the spring 7 protruding downwardly from the plane of the gear wheel 1 butt against such a fixed stop 9. This offers the advantage that when the spiral spring 7 butts against the fixed stop 9 no one-sided forces act on the gear wheel 1 which can lead to jamming or clamping of the gear wheel.

Thus the spiral spring 7 together with the fixed stop 9 limits the angle of rotation of the gear wheel 1 and thus an adjustment distance to which the traction element 5 can be wound on the drum 2 and thus adjusted.

Moreover, when the spiral spring 7 butts against the fixed stop 9 it is compressed and thus absorbs energy. If at a later stage the movement of the gear wheel 1 is reversed by being driven by the motor 6 in a correspondingly opposite direction, the spiral spring 7 again releases itself and releases the energy stored therein once more, whereby it assists the rotational movement of the gear wheel 1. Optionally occurring jamming or clamping can therefore be released more easily or with less expenditure of force. Furthermore the flexible damping of the stop by the spiral spring 7 makes the occurrence of such problems less likely from the outset.

Figure 3:
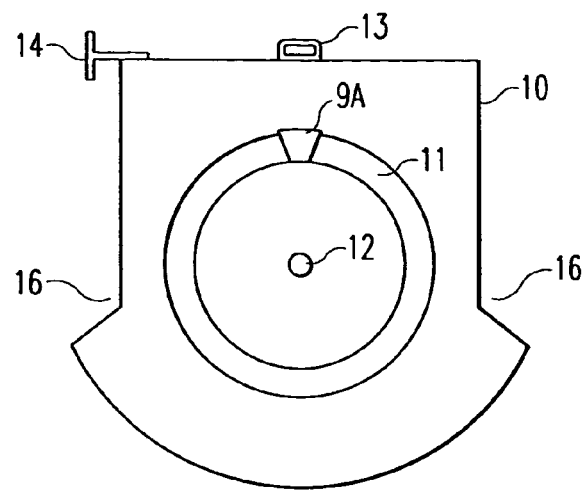
FIG. 3 is a lower face of a housing for the actuation device in FIG. 1.
Figure 4:
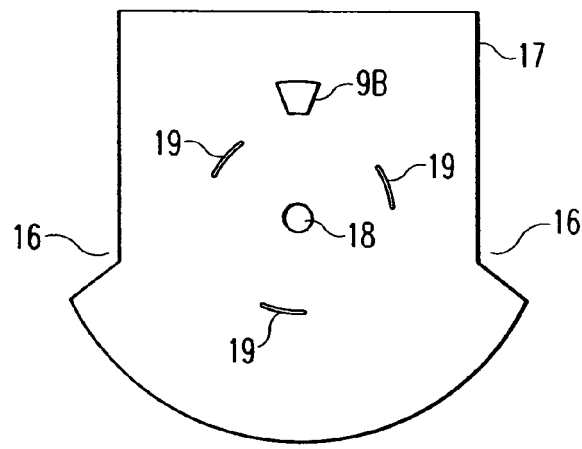
FIG. 4 is an upper face of the housing in FIG. 3.

A housing for the actuation device in FIGS. 1 and 2 is to be disclosed hereinafter with reference to FIGS. 3 and 4. FIG. 3 also shows a housing lower part 10 of such a housing whilst FIG. 4 shows a corresponding housing upper part 17. The terms 'lower' and 'upper' refer to the illustration in FIG. 2, namely the lower part in FIG. 3 is arranged below the gear wheel 1 in the assembled state in FIG. 2, whilst the upper part in FIG. 4 is arranged above the gear wheel 1 on the face of the drum 2. The resulting arrangement can however of course be fitted into any desired spatial position in a device in which the actuation device is to be used.

The housing lower part 10 in FIG. 3 and the housing upper part 17 in FIG. 4 are respectively shown in plan view, namely a view corresponding to FIG. 1.

The housing lower part 10 in FIG. 3 comprises an axle 12 which protrudes from the drawing plane and comprises a slightly smaller diameter than the recess 3 in FIG. 1. When the arrangement is assembled this axle 12 is inserted through the recess 3, whereby the gear wheel 1 and the drum 3 are pivotally mounted. The housing lower part 10 further comprises an annular recess 11 which is interrupted by a first stop 9*a*. The dimensioning of the annular recess 11 and its distance from the axle 12 is selected such that the section of the spiral spring 7 protruding downwardly from the plane of the gear wheel 1 can move in the assembled state in this annular recess 11. The first stop 9*a* acts as a lower stop for this downwardly protruding section of the spiral spring 7.

Moreover the housing lower part 10 can comprise fastening means 13 and 14, for example in the form of a eyelet 13 and a bracket 14, which facilitates the fastening of the housing and thus the actuation device in a motor vehicle seat for example.

The housing part 10 further comprises recesses 16. In the assembled state the gear wheel 1 protrudes over these recesses 16 and is thus easily accessible, for example to engage it with the gear wheel 20 in FIG. 1.

Similar recesses 16 are also provided in the housing upper part 17 in FIG. 4. The housing upper part 17 further comprises an aperture 18 which is positioned and designed such that when the housing is assembled the axle 12 of the housing lower part 10 passes through the aperture 18. The housing upper part 17 further comprises guides 19 which are arranged in the assembled state around the drum 2 in FIGS. 1 and 2.

Additionally a guide channel 15 is provided to guide the traction element 5 toward the drum 2. An upper stop 9*b* is finally positioned and arranged such that when the section of the spiral spring 7 projecting downwardly from the plane of the gear wheel 1 butts against the first stop 9*a* in FIG. 3 the section of the spiral spring 7 projecting upwardly from the plane of the gear wheel 1 simultaneously strikes against the upper stop 9*b*.

As already disclosed, for assembly the gear wheel 1 is then placed together with the drum 2 on the axle 12 in FIG. 3, so that the axle 12 passes through the aperture 3. Then the housing upper part 17 is correspondingly positioned on the housing lower part 10. The fastening of the housing upper part 17 on the housing lower part 10 can be carried out by means of mechanical means such as for example clips (not shown) or for example by means of bonding. The first stop 9*a* and the second stop 9*b* then carry out the task of the stop 9 in FIG. 1.

Figure 5:
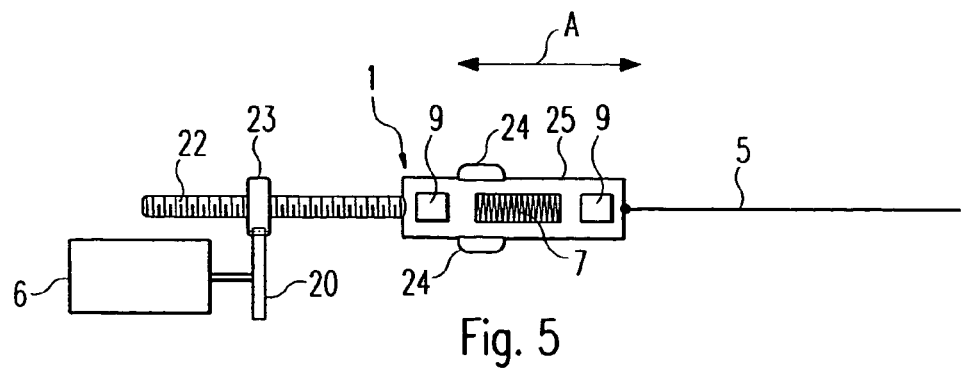
FIG. 5 is a further actuation device according to the invention.

In FIG. 5 a further embodiment of the present invention is shown. The elements corresponding to the embodiment already shown are indicated by the same reference numerals.

In the embodiment in FIG. 5, in contrast to the embodiment previously described, instead of a pivotally mounted gear wheel a linear movable force transmission element 1 serves to transfer the driving force of a motor 6 to a traction element 5. This comprises a threaded section 22 and a stop section 25. The driving force of the drive motor 6 is transferred to a gear wheel 20 and from there to a drive element 23. An outer face of the drive element 23 engages with the drive wheel 20. An inner face of the drive element 23 comprises a thread adapted to the threaded section 22 and is screwed thereon. The drive element 23 is held fixedly by guides (not shown) but can rotate driven by the gear wheel 20. Guides 24 are furthermore provided which engage with the stop section 25 and prevent rotation of the force transmission element 1 about its longitudinal axis. This leads to the drive element 23 and the threaded section 22 forming a spindle drive. When the drive element 23 is rotated via the gear wheel 20 by the driving force of the motor 6, the threaded section and thus the force transmission element 1 and the traction element 5 fastened at one end of the stop section 25 move in the longitudinal direction, namely in the direction of arrow A. The traction element 5 is consequently tensioned or released.

A spiral spring 7 is on the other hand arranged in the stop section 25. Fixed stops 9 are moreover provided. As in the embodiment of FIGS. 1-4 the fixed stops 9 together with the spiral spring 7 limit a possible adjustment distance of the traction element 5, as the spiral spring 7 butts against the fixed stops 9. The use of a spiral spring as a stop element on the force transmission element 1 also offers the same advantages as previously shown, namely clamping or jamming of the force transmission element 1 is prevented and a movement in the opposite direction is assisted.

As in the embodiment of FIGS. 1-4 the fixed stops 9 can be arranged in a corresponding housing and in particular also arranged on two faces of the stop section 25.

The embodiment shown in FIG. 5 is only one possibility for carrying out a linear adjustment. In principle it is also possible to connect the drive element 23 rigidly to the stop section 25 and to provide a separate threaded rod which is driven by the drive motor 6 and engages with the drive element 23. It is also possible to replace the threaded section 22 for example with a toothed rack which is driven by a gear wheel.

It is also not necessary to provide a separate stop section 25. Furthermore it is also conceivable to fit the spiral spring 7 directly into the threaded section 22.

Of course the actuation devices shown with reference to FIGS. 1-5 are merely to be seen as embodiments of the invention which can be varied in a plurality of ways. For example, instead of the spiral spring 7 it is possible to use another resilient element which can absorb energy when butting against a stop and subsequently release it again. In principle, the use of two fixed stops above and below the gear wheel and the thread, independent of the use of the spiral spring 7 or a further resilient stop element, is also possible, and in itself also reduces the danger of jamming. Finally it is also possible in principle to provide a rigid stop element instead of the spiral spring 7 and in its place to design the stop 9 and the stops 9a, 9b as resilient. In the case of two fixed stops this however has the disadvantage that two resilient elements have to be provided. Additionally manual actuation can be provided instead of actuation by means of a motor.

The invention claimed is:

1. Actuation device for actuating a traction element, with a movably mounted force transmission element for transferring an actuation force to the traction element, the force transmission element comprising a first stop means movable with the force transmission element, and
   with a fixed stationary stop means, the first stop means and the fixed stationary stop means being arranged such that they limit movement of the force transmission element, wherein at least one of the first stop means and the fixed stationary stop means comprises a resilient element which is designed such that it absorbs kinetic energy of the force transmission element when the first stop means butts against the fixed stationary stop means and that it releases the absorbed kinetic energy to the force transmission element when the first stop means moves away from the fixed stationary stop means;
   wherein the force transmission element comprises a wheel to transfer the actuation force from a drive means to the traction element; and
   wherein the first stop means is arranged such that it protrudes from the force transmission element from a plane in which the force transmission element is movable, in both directions perpendicular to the plane and such that the fixed stationary stop means comprises a first stop element arranged on a first face of the plane and a second stop element arranged on a second face of the plane as a minor image of the first stop element.

2. Actuation device according to claim 1, wherein the resilient element comprises a spring.

3. Actuation device according to claim 1, wherein the actuation device further comprises a drum element to wind on and unwind the traction element when the force transmission element moves.

4. Actuation device according to claim 3, wherein the drum element is coaxially mounted with the force transmission element for joint rotation.

5. Actuation device according to claim 3, wherein the drum element and the force transmission element are produced in one piece.

6. Actuation device according to claim 3, wherein the drum element includes a guide channel to facilitate winding of the traction element on the drum element.

7. Actuation device according to claim 1, wherein the force transmission element is pivotally mounted, and wherein the first stop means and the fixed stationary stop means limit an angle of rotation of the force transmission element.

8. Actuation device according to claim 1, wherein the force transmission element comprises a gear wheel.

9. Actuation device according to claim 1, wherein the first stop means comprises the resilient element, the resilient element being arranged in the force transmission element such that one axis along which the resilient element can be compressed is located in a plane in which the force transmission element is movably mounted.

10. Actuation element according to claim 9, wherein the resilient element is arranged in a recess in the force transmission element.

11. Actuation device according to claim 10, wherein the resilient element is clamped tightly in the recess.

12. Actuation device according to claim 1, wherein the actuation device comprises a housing which comprises the fixed stationary stop means.

13. Actuation device according to claim 1, wherein the actuation device comprises a motor to produce the actuation force.

14. Actuation device for actuating a traction element, with a movably mounted force transmission element for transferring an actuation force to the traction element, the force transmission element comprising a first stop means movable with the force transmission element, and
   with a fixed second stop means, the first stop means and the fixed second stop means being arranged such that they limit movement of the force transmission element, wherein the first stop means is arranged such that it protrudes from the force transmission element from a plane in which the force transmission element is movable, in both directions perpendicular to the plane and such that the fixed second stop means comprises a first stop element arranged on a first face of the plane and a second stop element arranged on a second face of the plane as a mirror image of the first stop element;
   wherein the force transmission element comprises a wheel to transfer the actuation force from a drive means to the traction element.

15. Actuation device according to claim 14, wherein the traction element is a cable coupled to the force transmission element.

16. Actuation device according to claim 14, wherein the force transmission element comprises a device for coupling to the traction element.

17. Actuation device according to claim 14, wherein at least one of the first stop means and the fixed second stop means comprises a resilient element designed such that it absorbs kinetic energy of the force transmission element when the first stop means butts against the fixed second stop means and that it releases the absorbed kinetic energy to the force transmission element when the first stop means moves away from the fixed second stop means.

18. Actuation device according to claim 14, wherein the force transmission element comprises a gear wheel.

19. Actuation device according to claim 14, wherein the actuation device further comprises a drum element to wind on and unwind the traction element when the force transmission element moves.

\* \* \* \* \*